Feb. 19, 1924.
1,484,251
F. H. BRENNAN
WINDSHIELD WIPER
Filed Aug. 20, 1921
3 Sheets-Sheet 1
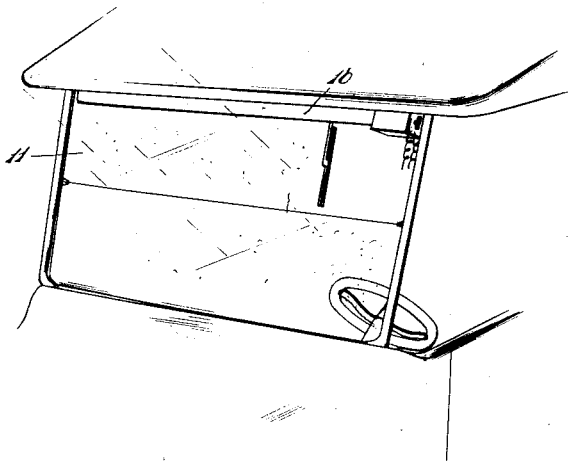
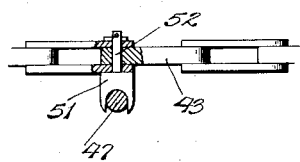
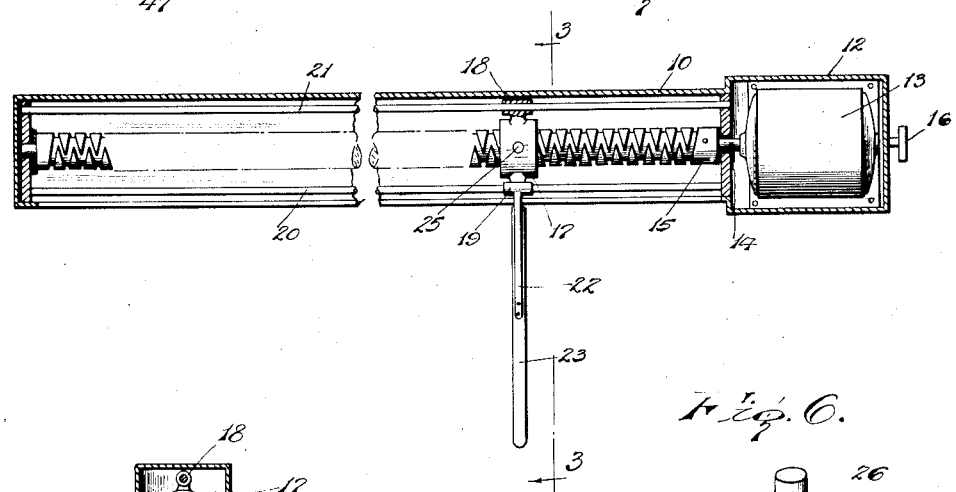
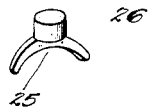
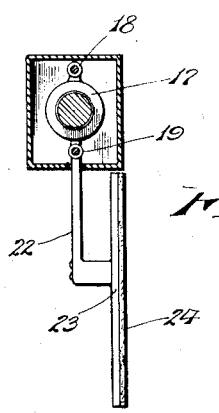
Inventor
F. H. Brennan.
By Lacey & Lacey, Attorneys

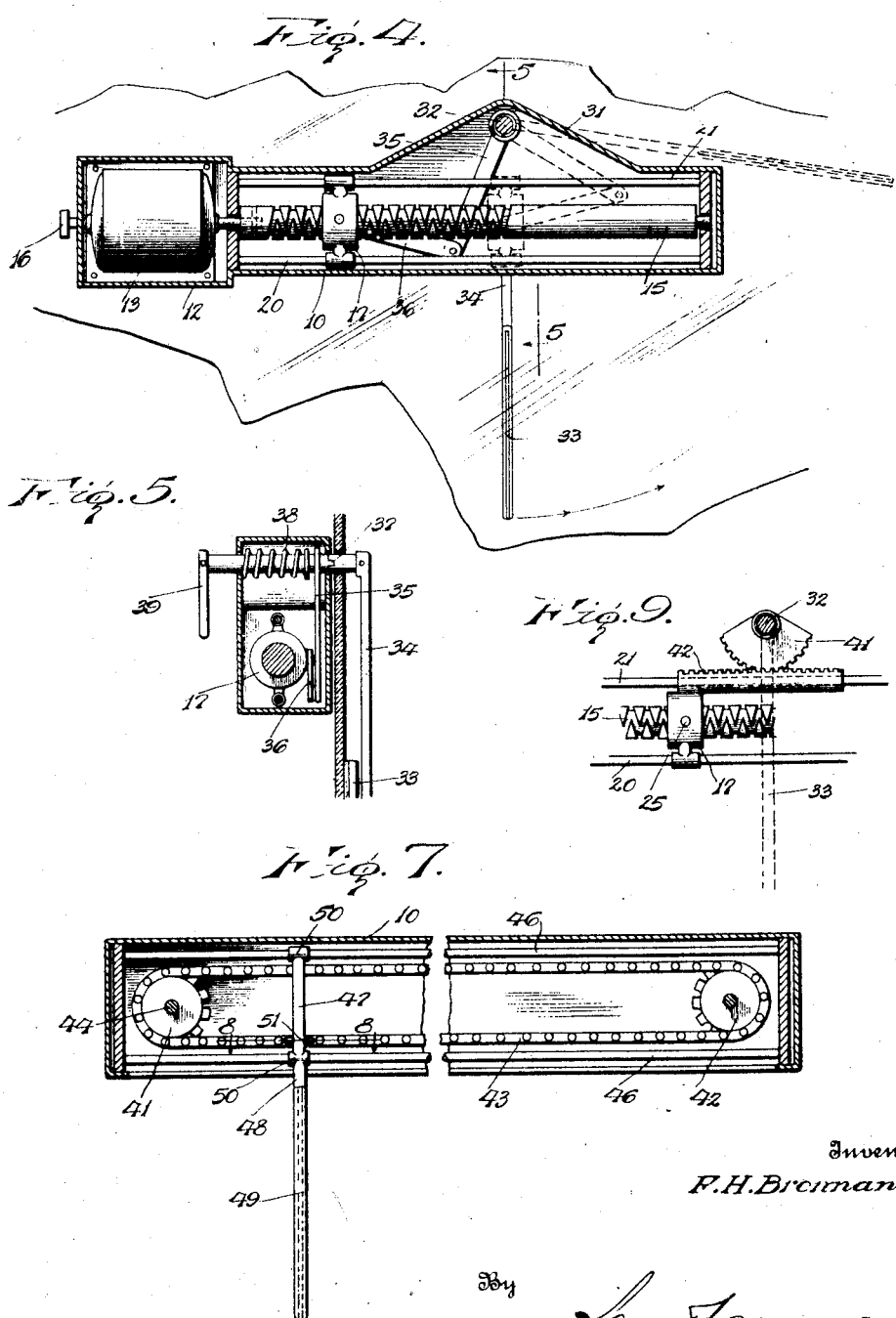

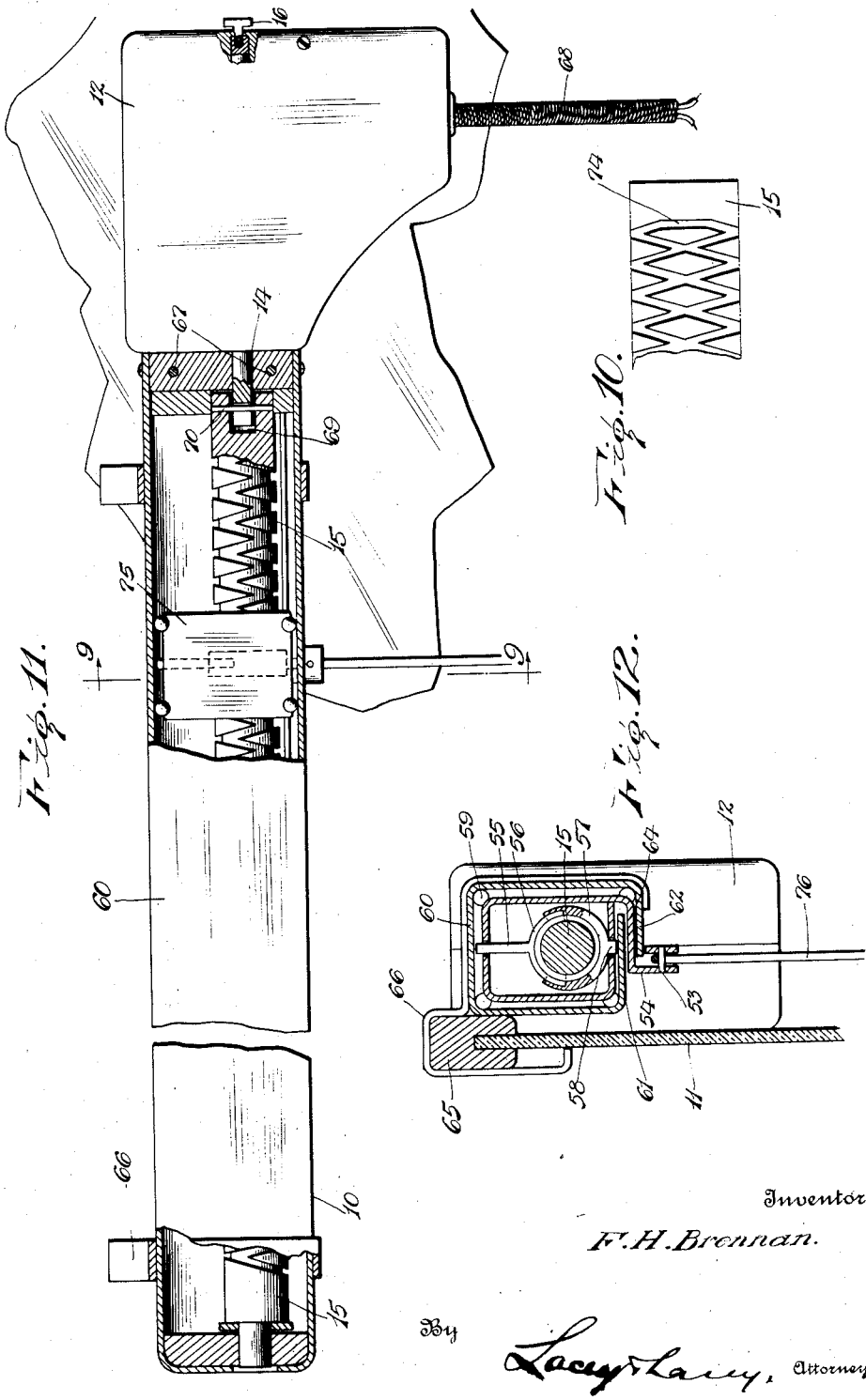

Patented Feb. 19, 1924.

1,484,251

UNITED STATES PATENT OFFICE.

FRANCIS H. BRENNAN, OF ALBANY, NEW YORK.

WINDSHIELD WIPER.

Application filed August 20, 1921. Serial No. 493,860.

*To all whom it may concern:*

Be it known that I, FRANCIS H. BRENNAN, a citizen of the United States, residing at Albany, in the county of Albany and State of New York, have invented certain new and useful Improvements in Windshield Wipers, of which the following is a specification.

The present invention relates to a wiper for wind shields on automobiles and the like which may be either motor driven or hand operated.

The main object of the invention is to provide a wiper of this character, which is of simple construction, easily applied to any shape or kind of wind shield, and very simple in operation.

Another object of the invention is to construct the device in such a manner that the mechanical parts are protected against dirt and dust and they are for this purpose enclosed in a suitable casing which is attached by either bolts or braces to the wind shield. The material used is as light as possible so as to not necessarily strain the shield. The motive source may be either electric motor, water motor, air, wind or vacuum motor, or it may be driven by means of a flexible shaft connected with the engine of the automobile.

In the accompanying drawings four different embodiments of the invention have been illustrated, and Figure 1 shows a perspective view with the device attached to the wind shield of an automobile;

Figure 2 is a longitudinal, sectional view of the device showing the first embodiment herein mentioned;

Figure 3 is a cross sectional view on the line 3—3 of Figure 2;

Figure 4 shows a longitudinal view in section of the second embodiment herein mentioned;

Figure 5 is a cross sectional view of Figure 4 along line 5—5;

Figure 6 is a detail view of one part of the mechanism;

Figure 7 is a longitudinal sectional view of the third embodiment of the invention;

Figure 8 is a sectional view along line 8—8 of Figure 7;

Figure 9 is a similar view to Figure 4 showing a modification thereof;

Figure 10 is an enlarged view of the thread for the actuating spindle, developed;

Figure 11 is a front view, partly in section, of a fourth embodiment of the invention, and Figure 12 is a cross section on line 9—9 of Figure 11.

Numeral 10 represents a casing preferably made of light sheet metal and adapted to be attached by means of bolts or braces along the top side of the wind shield 11.

At one end of the casing a box shaped enlargement 12 is shown in which a motor 13 is mounted, the shaft 14 of this motor is positively connected with the operating shaft 15 of the mechanism and this metal shaft is carried in suitable bearings at each end of the casing 10.

A handle 16 is shown outside of the casing for starting the motor 13.

The operating shaft 15 has endless right and left handed threads, which threads intersect each other as clearly indicated in the drawings and run together at each end. See Figure 10.

A carrier 17 is mounted around this operating shaft 15 and is shown with two projecting arms 18 and 19 each one embracing one of the guide rods 20 and 21, which guide rods are securely held at each end of the casing and are intended to keep the carrier 17 in upright position during its travel along operating shaft 15.

On the lower arm 19 of the carrier 17 is provided an extension 22 which rigidly supports the wiper blade 23. In a groove in this blade 23 a strip of rubber 24 or other flexible material is laid, and this forms the wiper proper which contacts with the surface of the wind shield and slides along the same during operation.

In the carrier 17, see Figs. 2 and 6, is pivoted a follower 25 provided with two wings 26 which are slightly pointed toward their ends and adapted to fit in the grooves of the thread portion of the shaft 15. The length of the wings is so selected that they over-lap the points formed at the intersection of the threads and it will be readily understood that when the carrier has traveled the entire length of the shaft during its revolution and reached the end of the thread, the follower 25 will turn slightly when hitting the end wall 74, see Figure 10, of the last groove of the thread, in this manner automatically registering with the return groove of the thread and thus reverse the direction of the motion of the carrier.

In the modification shown in Figures 4 and 5 the casing 10 with motor 13, operating shaft 15, guides 20 and 21, and carrier 17 is constructed as already described in connection with Figures 1, 2 and 3. In this case, however, the casing 10 is built out as at 31 to provide bearings for a spindle 32 upon which the wiper blade 33 is secured by means of an arm 34. On the same spindle is carried an arm 35 which is connected by means of a link 36 with the carrier 17. The coupling 37 actuated by a spring 38 is shown particularly in Figure 5 and is intended for engaging the arm 34 of the wiper through the arm 35 and the link connection 36 with the carrier. The disengagement is accomplished by a pull on the handle 39 so as to compress the spring 38 and disengage the coupling 37, whereupon the wiper may be operated by hand, by means of the handle 39. In this modification the wiper will perform a swinging or pendulum action instead of a parallel movement across the wind shield as is the case in the construction shown in Figures 2 and 3.

The second modification shown in Figures 7 and 8 consists of the same casing 10 in which the different mechanical parts are mounted. In this case, however, a pair of sprocket wheels 41 and 42 are mounted one at each end of the casing and with their shafts perpendicular to the surface of the wind shield. Over these sprocket wheels an endless chain 43 is run and this is operated by means of a motor connected with the shaft 44 of the sprocket wheel 41.

A pair of guide rods 46 are also used in this case and secured at each end of the housing. A carrier 47 engaging both of these guide rods 46 has a depending arm 48 upon which the wind shield 49 is mounted. On the carrier 47, which is preferably cylindrical between its two bearings 50 engaging the guide rods 46, the follower 51 is mounted so that it may be able to slide up and down between said bearings 50. This follower 51 has a round pin 52 which engages in the corresponding hole in the chain 43, this hole may preferably be one of those provided for the link pins in the chain.

It will be evident that when the motor is started and the sprocket wheel 41 rotates, the chain travels continuously and the wiper blade will be compelled to follow its motion across the wind shield through the connection formed by the follower 51 between the chain 43 and the carrier 47 and that when the wiper blade has reached the end of the casing and the link of the chain to which it is connected begins to travel around the sprocket wheel at this end, the follower will also travel around the sprocket and begin its return movement with the wiper blade. In this case, as in the first embodiment of the invention illustrated in Figures 2 and 3, the wiper blade travels across the wind shield parallel to its edges.

Instead of the link connection 36 between the spindle 32 and the carrier 17 is a modified construction as shown in Figure 9. On the spindle 32 is secured a toothed disc 41 which engages with a rack 42 forming an extension of the upper bearing on the carrier 17, and which bearing embraces the upper guide rod 21. The carrier as before stated is moved across the wind shield by means of the double screw 15 and the wiper blade 33 is also mounted on the spindle 32.

In Figures 11 and 12 still another embodiment of the invention is illustrated in which the carrier 75 is constructed as a box open at its ends. This box is preferably made of a metal plate which is folded at right angles in four places and the two flaps forming the bottom of the carrier are overlapping providing a horizontal space between them. The extreme edge of the lower flap is bent downwardly and provided with a pin to form a bearing 54 for the wiper arm 76 which in this case is hinged over the pin 53. In this manner the wiper arm 52 is free to swing in a plane parallel to the wind shield 11.

A follower 55 is mounted to swivel in the carrier 75 and to engage with its wings 56 in the grooves of the operating shaft 15, the latter being constructed as before described with endless right and left hand threads, so that the follower engaged in one, say the right hand thread, when reaching the extreme end of the threaded portion of the shaft 15, will strike the flat wall 74 and turn slightly to engage with the oppositely running thread and reverse the motion of itself and the carrier 75. On the under side of the operating shaft is provided a shoe 57 embracing the operating shaft 15 and having a downward pivot 58 in axial alignment with the pivot portion of the follower 55. This pivot engages in a corresponding hole in the bottom of the carrier 75. The shoe 57 engages with the top of the thread and does not enter the grooves thereof on the operating shaft 15.

Near each corner of the carrier 75 is provided a dent into which a small ball 59 is inserted so that the balls project beyond the outer contour of the carrier. These balls are so located that they engage in the four corners of the casing 60 in which the operating spindle and the carrier are housed.

It will thus be seen that, when the carrier is made to travel along the operating shaft 15, the balls will run along the corners of the box shaped housing 60, which corners in this manner form guide ways for the carrier.

The casing 60 is constructed in a similar manner to that of the carrier 75, that is to say, it is made of a folded sheet of metal with the bottom flaps 61 and 62 overlapping and forming a horizontal channel in the longitudinal direction of the casing and through which channel the lower flap 64 of the carrier 75 protrudes. This channel is preferably made as narrow as possible without pinching the flap 64 in order to prevent dust and moisture to enter through it into the casing 60. As the channel moreover is turned inwardly, that is, facing the wing shield 11, there is no possibility for snow or rain to collect therein.

On the top of the wind shield is preferably provided a liner 65 against which the upper part of the inner side of the casing 60 lies closely in order to prevent dust and rain to enter from the top between the wind shield and the casing, and the casing is secured by means of clips 66 in two or three places which tightly grip the casing 60 and hang over the top of the liner 65 which extends the whole length of the casing.

As before stated one end of the casing has a box shaped enlargement carrying the motor, and this enlargement is preferably made detachable and secured by means of bolts 67. A cable 68 is shown at the bottom of the box 12 for feeding the motor, and a handle 16 is provided for starting the motor.

The motor shaft 14 is made to engage in a recess 69 provided in the end of the operating shaft 15 in order that the motor with its box may easily be removed, the end of the motor shaft 14 has a longitudinal slit engaging with a pin 70 running across the recess 69 in the shaft 15.

It should be noted that the casing with the operating mechanism is attached on the outside of the wind shield when constructed as shown in Figures 2, 7 and 11, but the casing in the construction shown in Figure 4 is attached on the inside of the wind shield, a hole being provided for the wiper spindle so that the wiper 33 can be placed on the outside of the wind shield.

Having thus described the invention what is claimed as new is:

1. A device of the class described comprising a reciprocating element, an actuating member for said element, suitable connection between said element and said actuating member, a casing for said actuating member, a guide for the actuating member, and means in said casing for moving said actuating member along said guide; said means including a motor, an endless chain having pivoted links, one of the link pivots being bifurcated and engaging with said actuating member, and sprocket wheels associated with said motor and supporting said chain.

2. A device of the class described comprising a reciprocating element, an actuating member for said element, suitable connection between said element and said actuating member, a casing for said actuating member, a guide for the actuating member, and means in said casing for moving said actuating member along said guide; said means including a motor, an endless chain having pivoted links, one of the link pivots being bifurcated and having slidable engagement with said actuating member, and sprocket wheels associated with said motor and supporting said chain.

3. A device of the class described comprising a reciprocating element, an actuating member for said element, suitable connection between said element and said actuating member, a casing for said actuating member, a pair of spaced guide rods mounted in said casing, said actuating member including a cylindrical bar extending between said guide rods, and slides on said bar engaging the guide rods, means for moving said actuating member along said guide rods; said means including a motor, an endless chain having pivoted links, one of the link pivots being bifurcated and having slidable engagement with said cylindrical bar, and sprocket wheels for said chain revolubly mounted in said casing.

In testimony whereof I affix my signature.

FRANCIS H. BRENNAN. [L. S.]